United States Patent
Mangano et al.

(10) Patent No.: US 8,630,181 B2
(45) Date of Patent: Jan. 14, 2014

(54) COMMUNICATION SYSTEM AND CORRESPONDING INTEGRATED CIRCUIT AND METHOD

(75) Inventors: Daniele Mangano, Catania (IT); Giuseppe Falconeri, Catania (IT); Ignazio Antonino Urzi', Voreppe (FR)

(73) Assignees: STMicroelectronics (Grenoble 2) SAS, Grenoble (FR); STMicroelectronics Srl, Agrate Brianza (IT)

( * ) Notice: Subject to any disclaimer, the term of this patent is extended or adjusted under 35 U.S.C. 154(b) by 68 days.

(21) Appl. No.: 13/463,640

(22) Filed: May 3, 2012

(65) Prior Publication Data
US 2012/0281713 A1 Nov. 8, 2012

(30) Foreign Application Priority Data
May 4, 2011 (IT) .......................... TO2011A000393

(51) Int. Cl.
*H04L 1/00* (2006.01)
*H04L 12/28* (2006.01)
*G06F 15/173* (2006.01)

(52) U.S. Cl.
USPC .......................... 370/235; 370/412; 709/240

(58) Field of Classification Search
None
See application file for complete search history.

(56) References Cited

U.S. PATENT DOCUMENTS

| | | | |
|---|---|---|---|
| 7,519,067 B2* | 4/2009 | Farmer et al. ............ | 370/395.42 |
| 7,826,469 B1* | 11/2010 | Li et al. ........................ | 370/412 |
| 8,477,796 B1* | 7/2013 | Rao et al. ...................... | 370/412 |
| 2007/0201499 A1* | 8/2007 | Kapoor et al. ................ | 370/412 |
| 2008/0089351 A1 | 4/2008 | Hu | |
| 2011/0228674 A1* | 9/2011 | Pais et al. ...................... | 370/235 |

FOREIGN PATENT DOCUMENTS

WO 2005076539 A1 8/2005

OTHER PUBLICATIONS

Domanda di brevetto italiana n. TO2011A000393 .Procedimento di esame, Prol N. 184891, dated Apr. 10, 2011, p. 1.
European Search Report on European Patent Application No. IT TO20110393, printed Apr. 10, 2011, pp. 8.

* cited by examiner

*Primary Examiner* — Clemence Han
(74) *Attorney, Agent, or Firm* — Hogan Lovells US LLP

(57) ABSTRACT

A communication system transmits data from a first circuit over a communication channel to a second circuit, the data having a first priority and a second priority. The communication system includes a separation circuit, a first-in first-out (FIFO) memory, and a control circuit.

20 Claims, 4 Drawing Sheets

COMMUNICATION SYSTEM AND CORRESPONDING INTEGRATED CIRCUIT AND METHOD

RELATED APPLICATION

This application is a translation of and claims the priority benefit of Italy patent application number TO2011A000393, filed on May 4, 2011, entitled COMMUNICATION SYSTEM, AND CORRESPONDING INTEGRATED CIRCUIT AND METHOD, which is hereby incorporated by reference to the maximum extent allowable by law.

FIELD OF THE INVENTION

The present invention relates to communication systems and methods.

The invention has been developed with particular attention paid to its possible use for enabling communication between electronic circuits.

BACKGROUND OF THE INVENTION

Systems-on-Chip (SoCs) and Systems-in-Package (SiPs) typically comprise a plurality of circuits that communicate with one another via a shared communication channel. For instance, said communication channel can be a communication bus or communication network, such as, for instance, a Network-On-Chip (NoC) or Network-in-Package (NiP).

FIG. 1 shows a typical architecture of a said communication system.

In the example considered, data can be exchanged between an initiator or communication source 1 and a destination of the communication or target 6, and the data generated via the initiator 1 are transmitted to the target 6 through a data-link layer DL that comprises a communication channel 4.

Both the initiator and the target of the communication can comprise a single circuit or a plurality of sub-circuits. For instance, the initiator 1 can comprise a node of an NoC 12, an image-processing or video-processing circuit 14, and a generic processor 14. Instead, the target 6 can comprise, for instance, a node of a NoC 62 or various memories 64 and 66, such as, for instance, memories of the Double-Data-Rate (DDR) Random-Access Memory (RAM) type. Said memories 54 and 56 can also have different access rates.

In the case where a plurality of circuits have access to one and the same data-link layer DL, there can also be provided routing modules 18 and 68. For instance, in the example considered, each circuit 12, 14 and 16 segments the data to be sent to a target into different packets, which are sent to a module 18 that controls access to the data-link layer DL, i.e., to the shared communication channel 4. For instance, the module 18 can for said purpose implement also a scheduling algorithm, such as, for instance, a scheduling of the round-robin type. The module 18 can also implement other functions, for instance a control of the quality of service (QoS).

Next, the data are transmitted over the communication channel 4. Said operation can include a flow control and/or encoding operations, for instance, to reduce the activity of switching on the physical lines and to serialize or de-serialize the data.

The reception side is substantially complementary to the transmission side. In particular, also in this case a module 68 can be provided, which collaborates with the module 18 and transmits the data received via the channel 4 to the respective target circuit.

Moreover known are communication systems that comprise a plurality of communication channels to enable different QoS classes.

For instance, FIG. 2 shows an embodiment that comprises two communication channels 4a and 4b for transmitting low-priority traffic and high-priority traffic, respectively.

In this case, it is usually specified whether a data packet must be transmitted on the first communication channel or on the second communication channel. For instance, in the example considered, the initiator 12 can be a module that is assigned exclusively to the low-priority communication channel 4a, whereas the initiator 14 can be a module that is assigned exclusively to the high-priority communication channel 4b. Instead, the module 16 could be a module that can determine for each packet the respective transmission priority. In this case, the module 18 is configured for detecting the priority of the data and transmitting the data on the respective communication channel.

In a substantially similar way, also the targets can be assigned exclusively to any one of the communication channels or can also support a number of communication channels.

For instance, FIG. 3 shows a possible embodiment of the data-link layer DL currently used in the STNoC (ST Network-on-Chip) communication system.

In the example considered, the data-link layer DL receives data TX_Data from the initiator 1 and transmits said data through one of the two communication channels 4a or 4b. The data received RX_DATA are next transmitted to the target 6. In particular, in the example considered, the data are transmitted to the data-link layer DL by entities called "flits" (flow control units).

For instance, to transmit a flit on the first communication channel 4a, a first control signal TX_REQ1 is used to request transmission of low-priority data, i.e., to signal that low-priority data are available at the input TX_DATA, and a second control signal TX_ACK1 is used for signalling to the initiator 1 that the layer DL has received said data. In a substantially similar way, to transmit a flit on the second communication channel 4b, a control signal TX_REQ2 can be used for signalling that high-priority data are available at the input TX_DATA, and a second control signal can be used TX_ACK2 for signalling that the layer DL has received said data.

For instance, in the embodiment considered, a flit is addressed via a de-multiplexer 80 to the channel 4a or to the channel 4b according to the values of the signals TX_REQ1 and TX_REQ2. In a way substantially similar, a multiplexer 82 can be provided on the reception side, which supplies at output the flits received via the channels 4a or 4b.

The person skilled in the art will appreciate that there can also be provided other blocks for managing the physical communication on the communication channels 4a and 4b, such as, for instance, blocks 3a and 3b for transmitting the flits on the respective communication channel 4a and 4b, and blocks 5a and 5b for receiving the flits transmitted on the channels 4a and 4b, i.e., said blocks can implement the flow-control operations and/or encoding and decoding operations mentioned above. In fact, the blocks 3a and 3b can also manage directly on the transmission side the control signals TX_REQ1, TX_REQ2, TX_ACK1 and TX_ACK2, and the blocks 5a and 5b can manage similar signals RX_REQ1, RX_REQ2, RX_ACK1 and RX_ACK2 on the reception side for signalling that low-priority data or high-priority data are available (signals RX_REQ1, RX_REQ2) and to verify that reading of the data by the target 6 (signals RX_ACK1 and RX_ACK2) is through.

Furthermore, it is not necessary for the communication channels to be created via simple interconnection wires, but they can also comprise active components, such as, for instance, buffers.

FIG. 4 shows in this context a possible embodiment of the entire communication system currently used in the STNoC communication system.

In the example considered, a generic circuit A generates data to be transmitted to a generic circuit B. For instance, the circuit A can be a routing node that receives data from a plurality of circuits. In particular, the routing node can comprise an arbiter or scheduler that determines which packets are addressed to the data-link layer DL.

For instance, in the STNoC communication system, the sequence of the packets at output is saved in an output buffer 20. In particular, in the example considered, the low-priority packets are addressed via a de-multiplexer 202 to a first buffer 204a, such as, for instance, a first-in first-out (FIFO) memory, and the high-priority packets are addressed to a second buffer 204b.

The packets saved in the buffers 204a and 204b are next sent via a multiplexer 206 to the data-link layer DL, described previously with reference to FIG. 3, and transmitted via the layer DL to the target 6. In particular, for saving the packets received via the communication channels 4a and 4b, the target 6 can comprise an input buffer 70. In a substantially similar way, also in this case the packets can be separated via a de-multiplexer 702 into low-priority packets that are saved in a first buffer 704a, such as, for instance, a FIFO memory, and high-priority packets that can be saved in a second buffer 704b. Consequently, the buffers 704a and 704b supply at output the low-priority packets and high-priority packets, respectively, to the circuit B.

Consequently, all the logic necessary for a transmission channel is substantially duplicated, which introduces a considerable complexity and a high cost. In fact, said duplication is necessary to prevent a transmission block on the low-priority transmission channel, for instance on account of a possible filling of the buffer 704a, from possibly affecting transmission of the high-priority packets.

SUMMARY OF THE INVENTION

The object of the invention is to provide a communication system that is less complex and enables transmission of traffic with different priorities.

In fact, the inventors have noted that it is possible to transmit low-priority packets and high-priority packets also on a single shared communication channel.

With a view to achieving the aforesaid object, the subject of the invention is a communication system having the characteristics specified in claim 1. The invention also regards a corresponding integrated circuit and a corresponding method. Further advantageous characteristics of the invention form the subject of the dependent claims.

The claims form an integral part of the technical teaching provided herein in relation to the invention.

Various embodiments described herein refer to solutions that enable transmission of traffic with different priorities over a single communication channel.

According to the solution described herein, to prevent transmission of low-priority data from possibly affecting transmission of high-priority data, the communication system comprises on the reception side an additional buffer for reception of low-priority packets.

In various embodiments, a feedback signal is provided that signals to the transmission node or nodes information that enables identification of the status of said additional buffer.

For instance, in various embodiments, in the case where the additional reception buffer is full, the transmission of low-priority packets is inhibited to prevent said transmission from possibly blocking the subsequent transmission of high-priority packets.

BRIEF DESCRIPTION OF THE DRAWINGS

The invention will now be described purely by way of a non-limiting example with reference to the annexed drawings, in which.

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

As mentioned previously, the object of the invention is to provide a communication system for transmitting data with different priorities over a shared communication channel.

Figure 5:
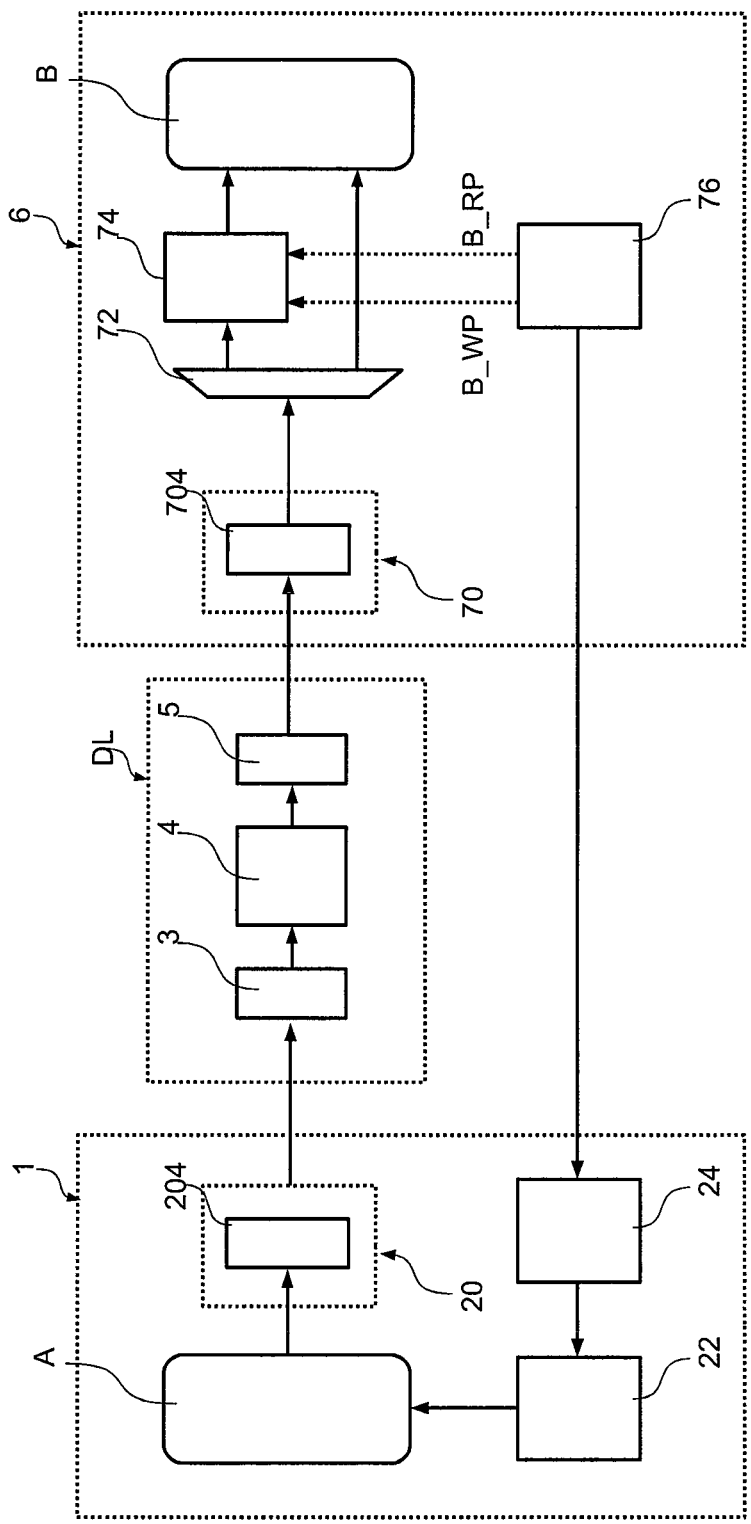
FIG. 5 shows a block diagram of a communication system according to the present solution.

FIG. 5 shows a first possible embodiment of the communication system configured for transmitting data from an initiator 1 of a communication over a communication channel 4 to a target 6 of the communication.

As mentioned previously, the initiator 1 comprises a circuit A for generating data, such as, for instance, a single electronic circuit or a routing node that receives data from a plurality of circuits. Likewise, the target 6 comprises a circuit B that is to receive the data generated via the circuit A, such as, for instance, another electronic circuit or another routing node that sends the data received via the channel 4 to a plurality of circuits.

In the embodiment considered, said data can have different priorities, such as, for instance, a low priority and a high priority.

In one embodiment, the circuit A saves the data to be sent to the circuit B in an output buffer 20. For instance, said buffer 20 can be a register or a FIFO memory 204. In one embodiment, one and the same buffer 20, for instance one and the same FIFO memory 204, is used for low-priority data and for high-priority data.

Next, the data saved in the output buffer 20 are transmitted over the communication channel 4. As mentioned previously, said transmission can be performed via a transmitter circuit 3 and a receiver circuit 5 that are configured for managing the physical communication over the communication channel 4.

In the embodiment considered, the target 6 then receives the data that have been transmitted over the communication channel 4. For instance, in the embodiment considered, said data are first saved in an input buffer 70. Also in this case, the buffer 70 can be a register or a FIFO memory 704. In one embodiment, one and the same buffer 70, for instance one and the same FIFO memory 704, is used for low-priority data and for high-priority data.

The person skilled in the art will appreciate that the buffers 20 and 70 are not strictly necessary for operation of the transmission over the channel 4 and their presence depends above all upon the implementation of the circuits A, B, 3 and 5. For instance, said buffers 20 and 70 can also be comprised directly in the circuits 3 and 5.

In general, the target 6 receives, via the communication channel 4, data that can have different priorities.

Figure 3:
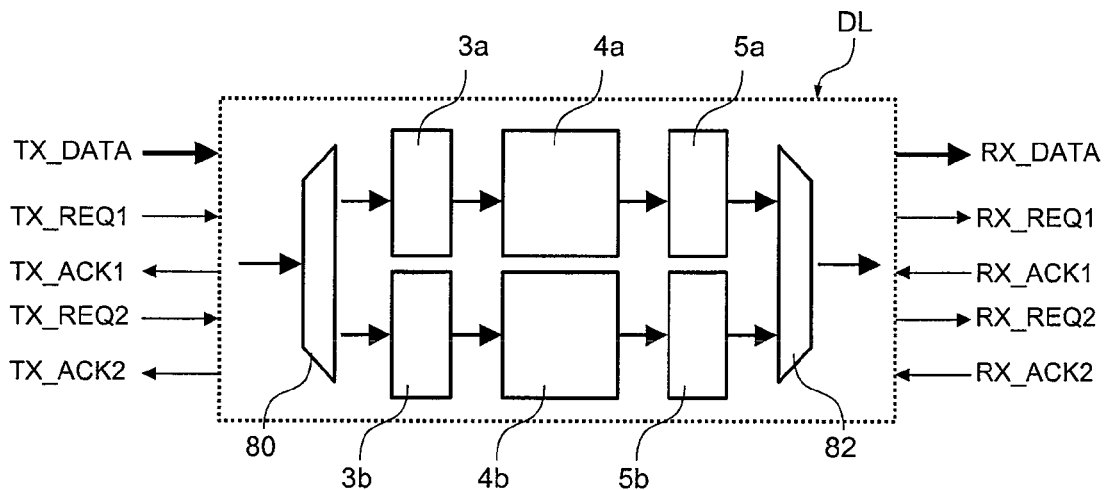
Figure 4:
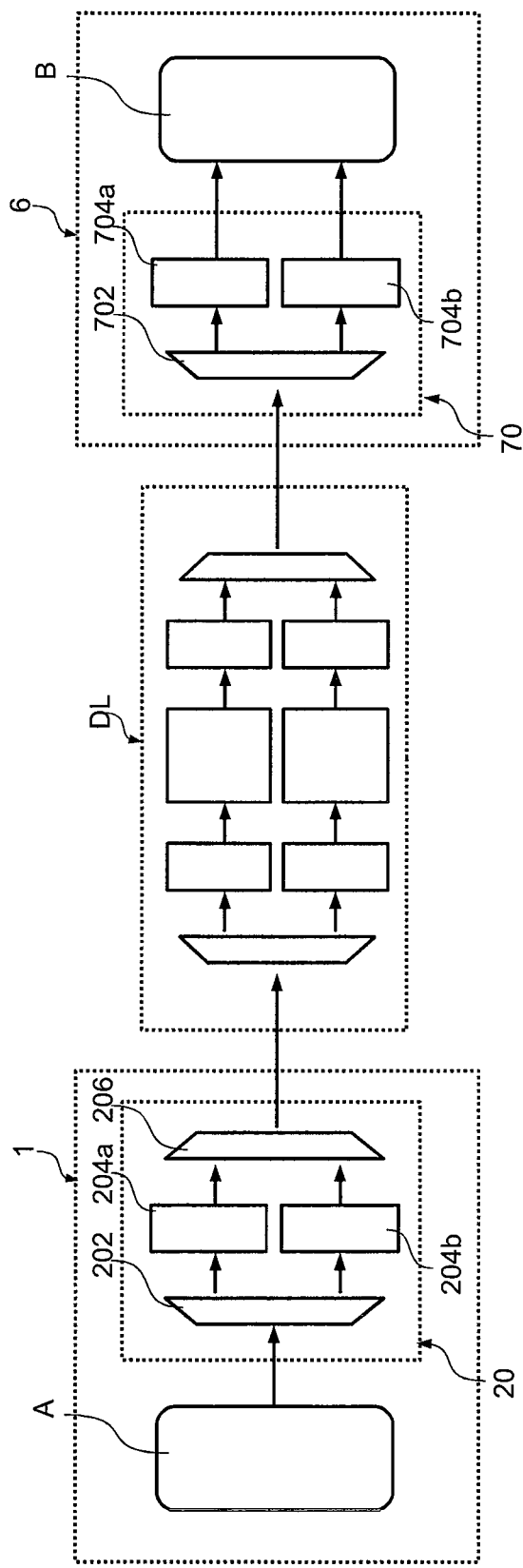

In one embodiment, the target 6 detects the priority of the data. For instance, to enable identification of the priority of the data, the initiator 1 can signal to the target 6 the priority of the data. For example, said signalling can be obtained via a control signal, such as, for instance, the signals TX_REQ1 and TX_REQ2 described with reference to FIG. 3 or a field in the data themselves. Furthermore, said signalling can be explicit, for instance via a field dedicated exclusively to signalling of the priority, or implicit, for instance via a field that enables identification of the original initiator or of the final target. In fact, as mentioned previously, some initiators or targets can also be configured for generating or accepting data only of a certain priority.

In the embodiment considered, the target 6 separates the data according to their priority, i.e., the circuit B receives data that have been separated according to their priority. For instance, said separation can be performed via a demultiplexer 72.

In one embodiment, to prevent transmission of low-priority data from possibly blocking transmission of high-priority data, an additional buffer 74 is provided for saving the low-priority data temporarily.

In one embodiment, said buffer 74 has a size that is greater than the sum of the size of the buffer of the entire transmission path, such as, for instance, the sum of the number of memory locations of the buffer 204, of possible buffers within the data-link DL, and of the buffer 704.

In fact, the inventors have noted that this enables completion of the transmission of data stored in the intermediate buffers even in the case where the circuit B is no longer able to receive data. The inventors have, however, noted that in this case it may be necessary to block transmission of new low-priority data because in practical implementations the buffer 74 should be of smaller size to prevent high latencies in the communication of the data.

For instance, in one embodiment, a control signal 76 is provided that signals to the initiator 1 the status of the buffer 74. The initiator 1 is then able to determine whether new low-priority data can be transmitted or whether the transmission of low-priority data should be inhibited. In particular, the transmission of low-priority data should be inhibited when the buffer 74 has been overfilled, i.e., when the buffer 74 is no longer able to guarantee that the communication channel 4 can be freed for transmission of high-priority data.

For example, in one embodiment the buffer 74 is a FIFO memory, in which the current write and read locations are indicated via a write pointer B_WP and a read pointer B_RP, respectively.

For instance, the control circuit 76 can be configured for generating said pointers. For example, said circuit 76 can be configured for incrementing the write pointer B_WP whenever new low-priority data are received. For example, said write pointer B_WP can be generated via a counter, such as, for instance, a counter with Gray coding, which is autonomously reset when the value of the counter reaches the total number of memory locations of the FIFO memory 74.

The circuit 76 can also be configured for managing communication with the circuit B and for generating the read pointer B_RP. For instance, in one embodiment, said circuit is configured for incrementing the read pointer B_RP when the circuit B acknowledges that reading of the data is through, for instance via the signal RX_ACK1 described with reference to FIG. 3. For example, said circuit can be created via a counter, such as, for instance, a counter with Gray coding.

In one embodiment, for determining the status of the FIFO memory 74, the initiator 1 comprises a circuit 22 configured for managing an additional control signal referred to as B_CREDIT, which is saved in a register. In particular, the signal B_CREDIT is initialized to the total number of the memory locations of the FIFO memory 74 and decremented at each writing of low-priority data in the buffer 20, i.e., when low-priority data are received by the circuit A.

Furthermore, the signal B_CREDIT is updated at certain instants in time k to take into account possible operations of reading from the FIFO memory 74. For instance, said updating can be performed at each clock cycle of the initiator 1, according to the following equation $$B\_CREDIT_k = B\_CREDIT_{k-1} + (B\_RP_k - B\_RP_{k-1}) \qquad (1)$$

For instance, in the embodiment considered, the circuit 22 receives for said purpose the read pointer B_RP from the target 6. To prevent any possible disturbance, also a synchronisation circuit 24 can be provided, configured for synchronising the read pointer B_RP with the clock signal of the initiator 1. For example, said circuit 24 can be obtained via a cascade of two or more flip-flops. In particular, this synchronisation circuit ensures that the circuit 22 uses valid versions of the read pointer B_RP; i.e., the operation of the circuit 22 is based in actual fact on a synchronised version of the read pointer B_RP.

Then, at each instant of time, the signal B_CREDIT identifies the number of memory locations that are certainly available in the buffer 74.

In one embodiment, the initiator 1 is configured to inhibit transmission of low-priority data when the signal B_CREDIT is equal to zero.

Figure 1:
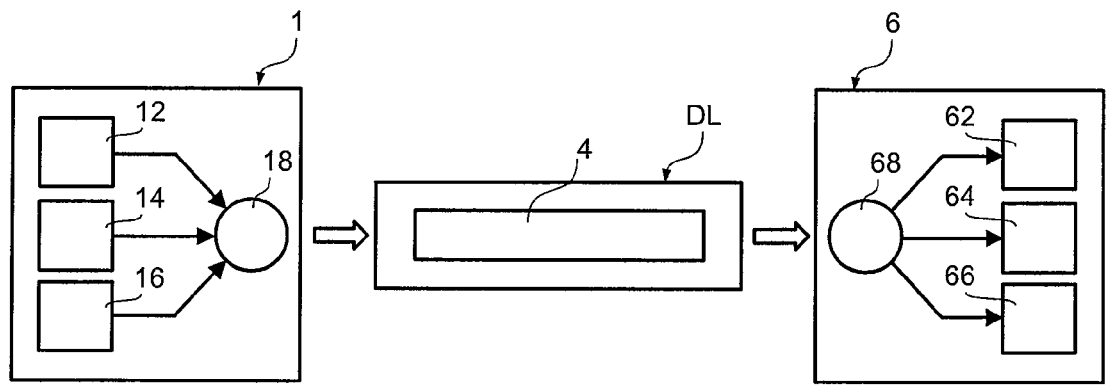
FIGS. 1 to 4 show communication systems according to the prior art, previously described.

For instance, in the case where the initiator comprises a plurality of circuits 12, 14 and 16 and a routing module 18 (see for example FIG. 1), the module 18 can be configured for no longer accepting low-priority data from the circuits 12, 14 and 16. For instance, this can be obtained via a possible signal acknowledging reception of data, such as the signals TX_ACK1 and TX_ACK2 described with reference to FIG. 3.

In one embodiment, transmission of the data over the communication channel 4 is performed via an asynchronous communication protocol, whereas both of the components 1 and 6 are synchronous; i.e., operation of the transmitter component 1 is synchronised with a first clock signal and operation of the receiver component 6 is synchronised with a second clock signal.

For instance, situations of this kind exist frequently in SoCs or SiPs, such as circuits that are aimed at mobile or multimedia applications, in which different circuits of the "Intellectual Property" (IP) type are connected together to form complex systems. In fact, said systems can include also asynchronous systems, i.e., systems without clock signal or systems of the multi-clock type that use different clock signals.

In fact, in the light of the difficulty of implementing asynchronous links with virtual channels, the inventors have noted that the solution described herein can play a particularly important role.

In the embodiment considered, the circuit 3 is hence implemented via an interface system configured for converting the synchronous communication generated by the transmitter component 1 into an asynchronous communication, and the circuit 5 is implemented via an interface system configured for converting the asynchronous communication received by the interface system 3 again into a synchronous communication.

Asynchronous circuits are frequently based upon a signalling protocol comprising four "handshaking" steps. In this case, the insensitivity to the delay is obtained via a particular encoding of the data; i.e., the validity of the data can be recognized also from the data themselves.

Figure 6:
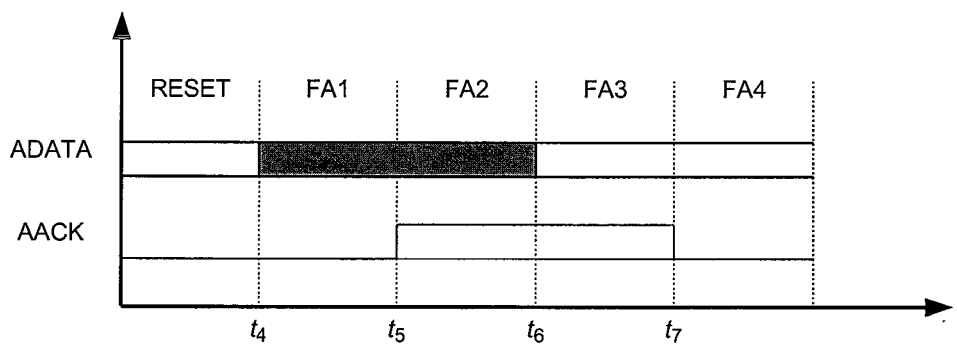
FIGS. 6 to 8 show possible embodiments of interface systems that can be used within the communication system of FIG. 5.

For instance, FIG. 6 shows a communication scheme based upon a four-step signalling protocol, where the signal on a bus ADATA itself signals the start of a new communication. In this case, a signal AACK for signalling the fact that the receiver component has been able to sample the data is in any event expedient.

In this case, both the transmitter component and the receiver component are in an initial condition referred to as RESET, and, for signalling the start and end of a communication, the signal on the bus ADATA is directly used. For instance, typical four-step protocols are the "Dual-Rail" or "1-of-N" protocols.

For instance, for transmitting the logic value '0' (step FA1), it is possible to transmit in actual fact at an instant $t_4$ the sequence of bits "01" on two different lines. In a way substantially similar, for transmitting the logic value '1', it is possible to transmit in actual fact the sequence of bits "10".

The receiver component detects said signal on the bus ADATA and acknowledges that reading is through (step FA2); i.e., it changes the logic value of the signal AACK, for instance it changes the logic level from '0' to '1'.

Consequently, the transmitter component detects the change of the signal AACK at an instant $t_5$, and the transmitter component signals end of the communication at an instant $t_6$ (step FA3). For example, to signal end of the communication the transmitter component can transmit the sequence of bits "00".

Finally, said sequence of bits is detected by the receiver component and also this returns into the initial condition; i.e., the receiver component again changes the logic value of the signal AACK.

The transmitter component can detect said change at an instant $t_7$ and terminates the communication (step FA4).

Hence, a four-step protocol can also be detected in an asynchronous way, i.e., at any moment.

Figure 7:
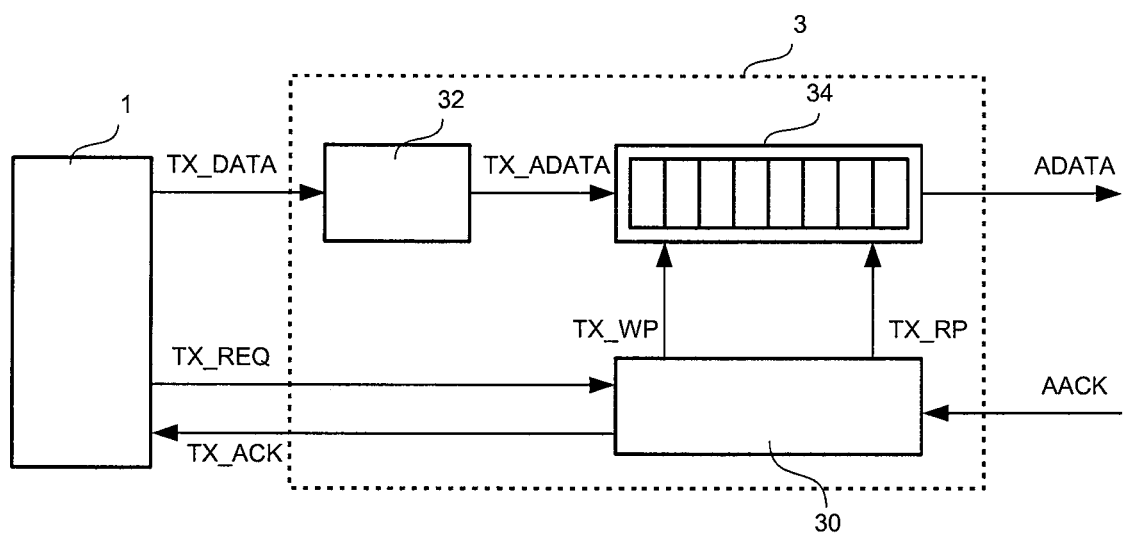

FIG. 7 shows a possible embodiment of the interface system 3 configured for converting the synchronous communication generated by the transmitter component 1 into an asynchronous communication.

In the embodiment considered, the system 3 receives, from the synchronous circuit 1 the data signal TX_DATA, which comprises a field for identification of the priority of the data, and a signal TX_REQ indicating the fact that the data signal TX_DATA contains new data. Preferably, the system 3 transmits also to the synchronous circuit 1 a signal TX_ACK that acknowledges that reading of the data TX_DATA is through.

Next the system 3 converts, according to an asynchronous communication protocol, the data received from the circuit 1 into encoded data ADATA, and transmits them through the channel 4 and the interface system 5 to the synchronous system 6. To verify that reception of the data is through, the system 3 receives from the system 5 an asynchronous read-acknowledge signal AACK.

In particular, to manage communication between the circuits 1 and 5, the system 3 comprises a FIFO memory 34, in which the current write and read locations are indicated via a write pointer TX_WP and a read pointer TX_RP, respectively.

Furthermore, the system 3 comprises a circuit 32, such as, for instance, a combinational circuit, which receives from the circuit 1 the data TX_DATA and supplies at output encoded data TX_ADATA. In particular, the circuit 32 is configured for encoding the data TX_DATA according to the specific asynchronous protocol used for the asynchronous communication.

In the embodiment considered, the encoded data TX_ADATA are next written in the FIFO memory 34. For instance, in the embodiment considered, said writing of the data TX_ADATA in the FIFO memory 34 is controlled via a control circuit 30 that manages the write pointer TX_WP. For example, in the embodiment considered, the write pointer TX_WP is incremented and the signal TX_ADATA is saved in the respective memory location when the signal TX_REQ indicates that new data are available. The person skilled in the branch will appreciate that it is also possible to write the data TX_ADATA first in the FIFO memory 34 and increment just the write pointer TX_WP after.

This enables direct provision of the step FA1 of FIG. 6. In fact, in the case of the first writing of data in the FIFO memory 34, the encoded data TX_ADATA are immediately available at the output of the FIFO memory 34; i.e., the data are immediately available on the bus ADATA.

Furthermore, the saving of data already encoded in the FIFO memory 34 avoids the need for further control circuits to verify transmission of the data on the bus ADATA.

In the embodiment considered, passage to the step FA3 of FIG. 6 is performed asynchronously and is driven directly via the signal AACK. For instance, in the embodiment considered, the signal AACK is used for resetting the contents of the memory location currently being read. In particular, in one embodiment, the reset operation is driven directly via the rising edge of the signal AACK. For said purpose, each memory location of the FIFO memory 34 can be made up of a plurality of registers with asynchronous reset.

In general, the control circuit 30 is then configured for resetting the contents of the memory location indicated via the pointer TX_RP when a rising edge of the signal AACK is detected, or alternatively a falling edge in the case of an active-low signalling protocol.

Finally, passage to the fourth step FA4 of FIG. 6 is again driven via the signal AACK. In particular, the system 3 remains waiting for the signal AACK to change its logic value again to terminate the communication. For instance, in the embodiment considered, reading of the data ADATA from the FIFO memory 34 is controlled via the control circuit 30 that also manages the read pointer TX_RP. For instance, in the embodiment considered, the read pointer TX_RP is incremented when a falling edge of the signal AACK is detected, or alternatively a rising edge in the case of an active-low signalling protocol.

This means, in the case where further data are available in the FIFO memory 34, said data are immediately set on the bus ADATA. Next, the control circuit 30 detects the rising edge and the falling edge of the signal AACK again to verify proper reception of the data and for completion of the transmission.

A possible embodiment of an interface system 3 of this sort is described in detail in the Italian patent application No. TO2010A001017 filed in the name of the present applicant, the contents of which are entirely incorporated herein for reference.

Figure 8:
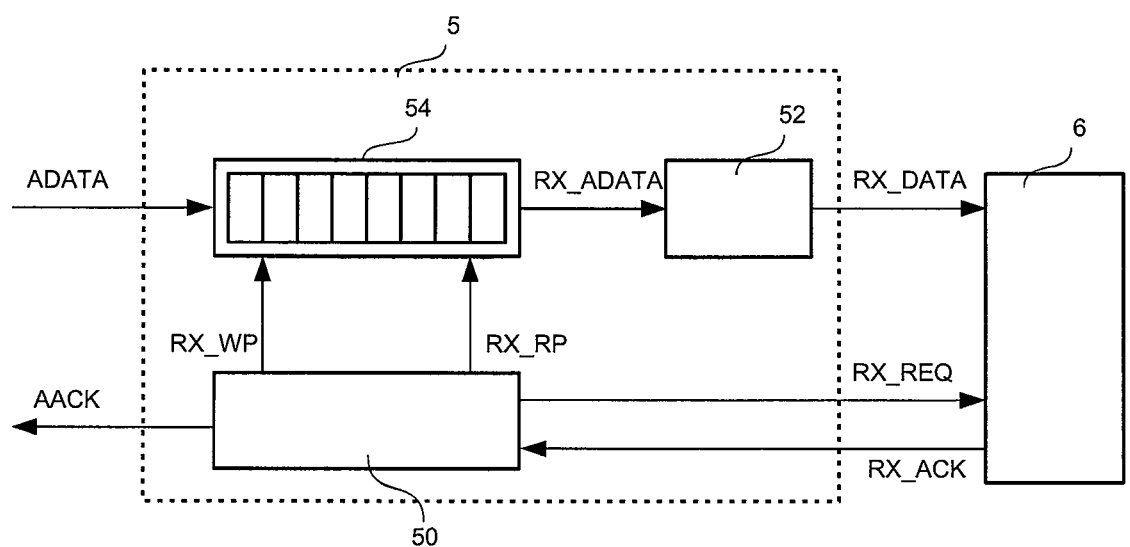

Instead, FIG. 8 shows a possible embodiment of the interface system 5 configured for converting the asynchronous communication received by the interface system 3 again into a synchronous communication.

In the embodiment considered, the system 5 receives from the system 3 the data signal ADATA and, to acknowledge that reception of the data is through, the system 5 generates the asynchronous read-acknowledge signal AACK.

Next, the system 5 converts the data received from the system 3 and transmits them to the synchronous circuit 6.

In particular, to manage communication between the circuits 3 and 6, the system 5 comprises a FIFO memory 54, in which the current write and read locations are indicated via a write pointer RX_RP and a read pointer RX_RP, respectively.

Figure 2:
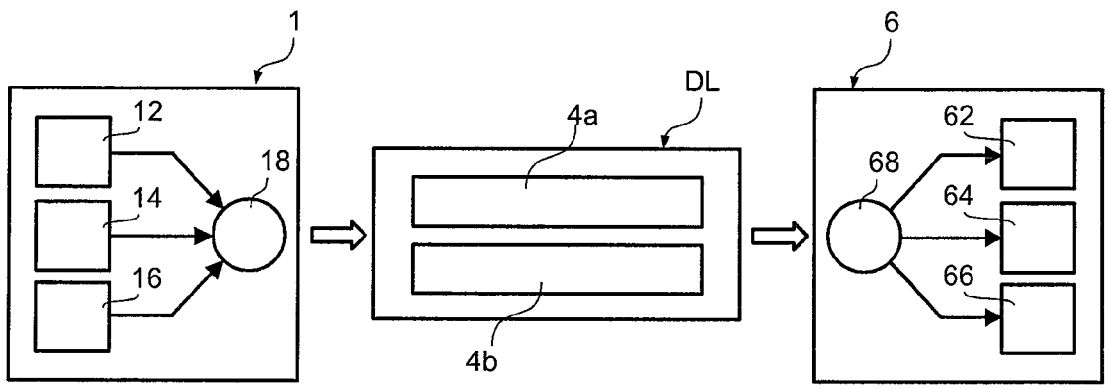

In the embodiment considered, writing of the data ADATA in the FIFO memory 54 is controlled via a control circuit 50 that manages the write pointer RX_WP according to the data signal ADATA. For instance, in the embodiment considered, the write pointer RX_WP is incremented when valid data are detected on the line ADATA (step FA1 of FIG. 2b).

At the same moment the logic value of the signal AACK can also be changed to acknowledge that writing of the data ADATA in the FIFO memory 54 (step FA2) is through. Next, when the line ADATA indicates the end of the transmission (step FA3), the logic value of the signal AACK is changed again (step FA4).

The control circuit 50 is also responsible for reading of the data from the FIFO memory 54. In particular, in the embodiment considered, the circuit 50 monitors the status of the FIFO memory 54, and in the case where new data are available, the circuit increments the read pointer and reads said data RX_ADATA from the FIFO memory 54. In particular, in the embodiment considered, said reading is performed synchronously, i.e., in response to the clock signal of the synchronous circuit 6.

Preferably, the circuit 50 is also configured for changing the logic value of the line RX_REQ to indicate the fact that new data are available.

The system further comprises a circuit 52, such as, for example, a combinational circuit, which converts the data read from the FIFO memory 54, i.e., the data RX_ADATA, and supplies at output decoded data. In particular, the circuit 52 is configured for decoding the data RX_ADATA according to the specific asynchronous protocol used for the asynchronous communication.

Finally, when the circuit 50 detects a change in the logic value of the signal RX_ACK, the circuit 50 can terminate the transmission.

The circuit 50 described previously hence monitors periodically the status of the FIFO memory 54 and, in the case where new data are available in the FIFO memory 54, said data are immediately transmitted to the synchronous circuit 6.

In one embodiment, to prevent possible glitches on the asynchronous interface, the logic circuits used for selecting the memory locations within the FIFO memories can use a Gray coding.

A possible embodiment of a said interface system 5 is described in detail in the Italian patent application No. TO2011A000050 filed in the name of the present applicant, the contents of which are entirely incorporated herein for reference.

As mentioned previously, the buffers 20 and 70 are not strictly necessary for operation of the present solution. In fact, in the solution described previously, the function of the buffer 20 could be performed via the FIFO memory 34 of the interface system 3, and the function of the buffer 70 could be performed via the FIFO memory 54 of the interface system 5.

The solution described herein thus enables transmission of data with different priorities over a common communication channel; i.e., the data are transmitted over one and the same communication channel.

Consequently, the complexity of the data-link layer remains substantially unaltered as compared to classic systems that comprise just a single communication channel and in which all the data have the same priority. However, as compared to these systems, the solution described herein uses an additional buffer for low-priority data. Said buffer guarantees that the communication channel can be freed for transmission of high-priority data. In particular, in various embodiments, the transmitter is configured to inhibit transmission of new low-priority data when a feedback signal received by the receiver indicates that the buffer is no longer able to guarantee that the communication channel can be freed for transmission of high-priority data.

Furthermore, the solution proposed herein can also be used in systems of the multi-clock type that use different clock signals.

Of course, without prejudice to the principle of the invention, the details of construction and the embodiments may vary widely with respect to what has been described and illustrated herein purely by way of example, without thereby departing from the scope of the present invention, as defined the ensuing claims.

We claim:

1. A communication system for transmitting data from a first circuit over a communication channel to a second circuit, wherein said data can have a first priority and a second priority, comprising:
   a separation circuit configured for:
      a) receiving said data transmitted over said communication channel;
      b) detecting the priority of said data transmitted over said communication channel;
      c) separating said data transmitted over said communication channel according to their priority into data with said first priority and data with said second priority; and
      d) transmitting said data with said second priority to said second circuit;
   a first-in first-out (FIFO) memory configured for:
      a) receiving said data with said first priority from said separation circuit;
      b) temporarily saving said data with said first priority; and
      c) transmitting said data saved temporarily in said memory to said second circuit;
   a control circuit configured for:
      a) detecting the status of said memory; and b) transmitting a control signal determined according to the status of said memory to said first circuit.

2. The system according to claim 1, comprising:
a first interface system configured for receiving data from said first circuit and for transmitting said data received from said first circuit over said communication channel; and
a second interface system configured for receiving said data transmitted over said communication channel and for transmitting said data transmitted over said communication channel to said separation circuit.

3. The system according to claim 1, comprising one or more buffers set between said first circuit and said separation circuit for temporarily saving said data received from said first circuit and/or said data transmitted over said communication channel, wherein said one or more buffers comprise a plurality of memory locations, and wherein said memory has a number of memory locations that is greater than the total number of the memory locations of said one or more buffers.

4. The system according to claim 1, wherein said control signal signals to said first circuit the fact that said memory is unable to guarantee that said communication channel can be freed for transmission of data with said second priority.

5. The system according to claim 4, wherein said control circuit takes into account data with said first priority received from said first circuit and data with said first priority sent to said second circuit.

6. The system according to claim 5, wherein said control circuit comprises:
a first control circuit configured for managing a read pointer indicating the memory location from which the data temporarily saved in said memory are read; and
a second control circuit configured for determining the status of said memory according to said read pointer.

7. The system according to claim 1, wherein said first circuit signals to said separation circuit the priority of the data.

8. The system according to claim 1, wherein said control signal is an acknowledge signal that signals to said first circuit the fact that said communication system has received data with said first priority from said first circuit.

9. An integrated circuit comprising a first circuit, a second circuit, and a communication system for transmitting data from said first circuit over a communication channel to said second circuit according to claim 1.

10. A communication method for transmitting data from a first circuit over a communication channel to a second circuit, wherein said data can have a first priority and a second priority, comprising:
transmitting said data received from said first circuit over said communication channel;
receiving said data transmitted over said communication channel;
detecting the priority of said data transmitted over said communication channel;
separating said data transmitted over said communication channel according to their priority into data with said first priority and data with said second priority;
transmitting said data with said second priority to said second circuit;
temporarily saving said data with said first priority in a first-in first-out (FIFO) memory;
transmitting said data temporarily saved in said memory to said second circuit;
detecting the status of said memory; and
transmitting a control signal determined according to the status of said memory to said first circuit.

11. A communication method for transmitting data from a first circuit over a communication channel to a second circuit, wherein said data can have a first priority and a second priority, comprising:
providing a separation circuit for:
a) receiving said data transmitted over said communication channel;
b) detecting the priority of said data transmitted over said communication channel;
c) separating said data transmitted over said communication channel according to their priority into data with said first priority and data with said second priority; and
d) transmitting said data with said second priority to said second circuit;
providing a first-in first-out (FIFO) memory for:
a) receiving said data with said first priority from said separation circuit;
b) temporarily saving said data with said first priority; and
c) transmitting said data saved temporarily in said memory to said second circuit;
providing a control circuit for:
a) detecting the status of said memory; and
b) transmitting a control signal determined according to the status of said memory to said first circuit.

12. The method according to claim 11, comprising:
providing a first interface system for receiving data from said first circuit and for transmitting said data received from said first circuit over said communication channel; and
providing a second interface system for receiving said data transmitted over said communication channel and for transmitting said data transmitted over said communication channel to said separation circuit.

13. The method according to claim 11, comprising providing one or more buffers set between said first circuit and said separation circuit for temporarily saving said data received from said first circuit and/or said data transmitted over said communication channel, wherein said one or more buffers comprise a plurality of memory locations, and wherein said memory has a number of memory locations that is greater than the total number of the memory locations of said one or more buffers.

14. The method according to claim 11, wherein said control signal signals to said first circuit the fact that said memory is unable to guarantee that said communication channel can be freed for transmission of data with said second priority.

15. The method according to claim 14, wherein said control circuit takes into account data with said first priority received from said first circuit and data with said first priority sent to said second circuit.

16. The method according to claim 15, wherein said control circuit comprises:
a first control circuit configured for managing a read pointer indicating the memory location from which the data temporarily saved in said memory are read; and
a second control circuit configured for determining the status of said memory according to said read pointer.

17. The method according to claim 11, wherein said first circuit signals to said separation circuit the priority of the data.

18. The method according to claim 11, wherein said control signal is an acknowledge signal that signals to said first circuit the fact that said communication system has received data with said first priority from said first circuit.

19. The method according to claim 11, wherein the method is practised on an integrated circuit.

20. The method of claim 19 wherein the integrated circuit further comprises a first circuit and a second circuit, and the communication method is used for transmitting data from said first circuit over a communication channel to said second circuit.

* * * * *